March 26, 1935.   J. H. PETERMANN, SR., ET AL   1,995,940
CRATE CONSTRUCTION
Filed Oct. 10, 1933    2 Sheets-Sheet 1
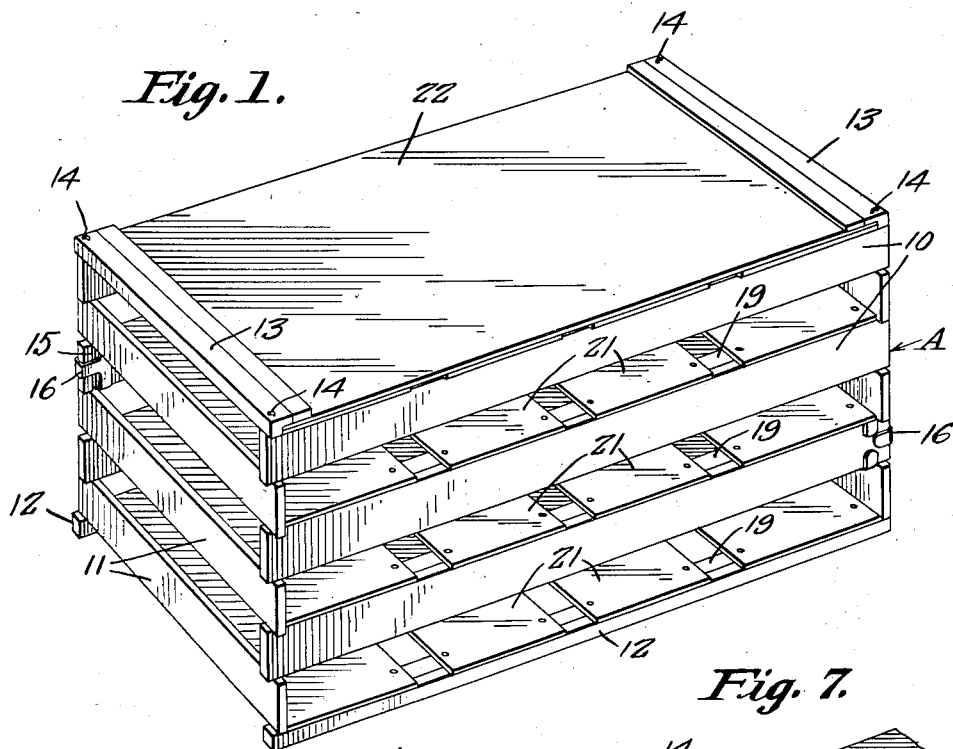
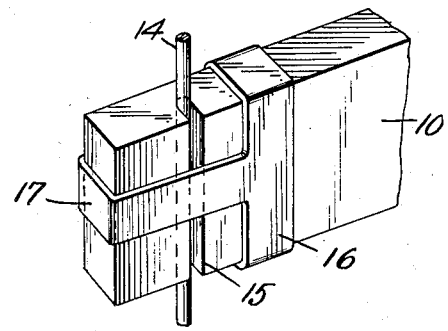
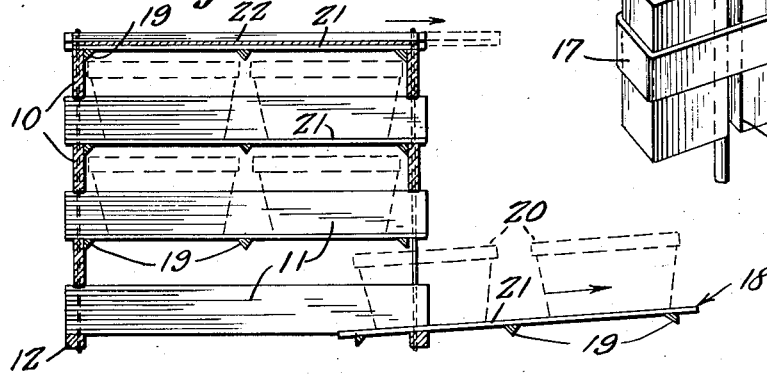
John H. Petermann, Sr.,
Carroll Schwartz,
Alban Atkinson,
INVENTORS
BY Victor J. Evans & Co. ATTORNEY
WITNESS March 26, 1935. J. H. PETERMANN, SR., ET AL 1,995,940
CRATE CONSTRUCTION
Filed Oct. 10, 1933 2 Sheets-Sheet 2
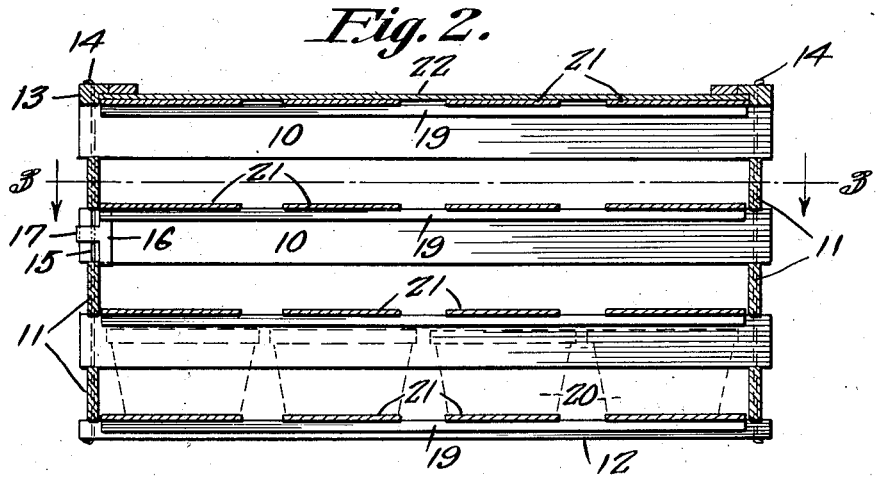
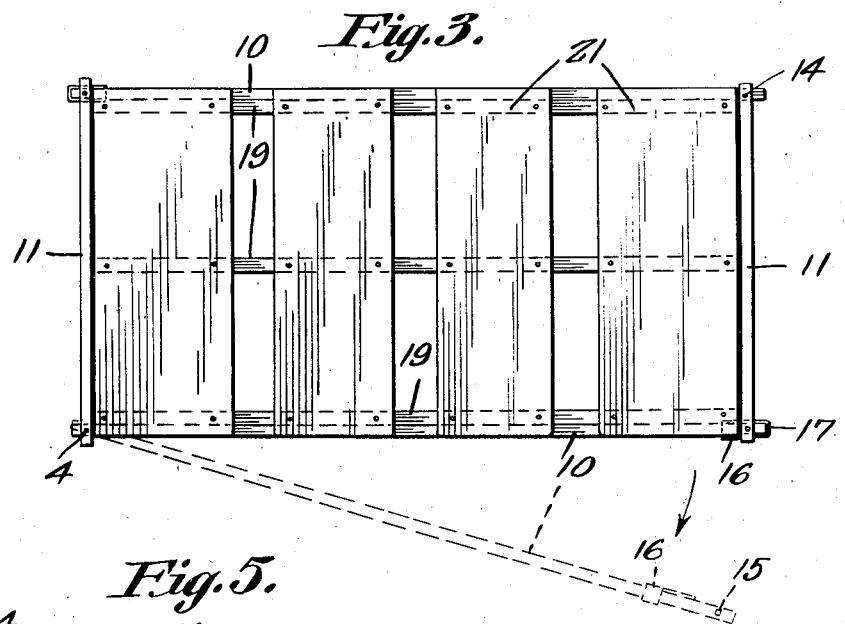
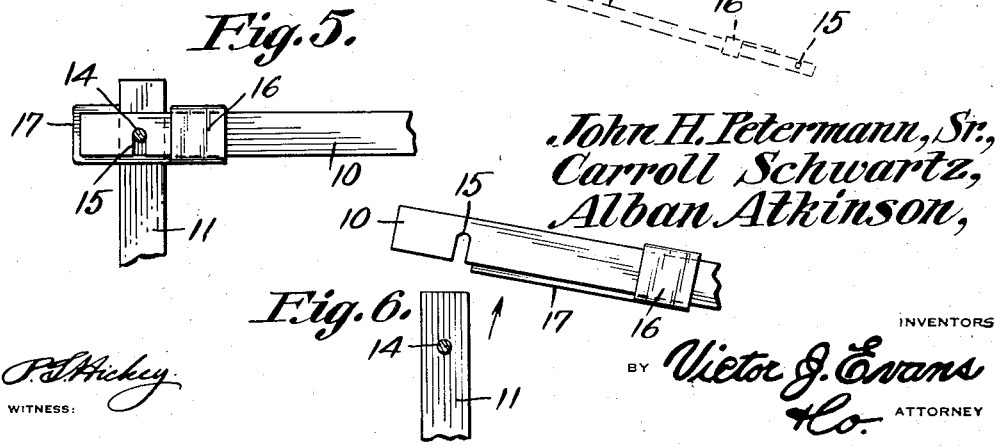

Patented Mar. 26, 1935

1,995,940

UNITED STATES PATENT OFFICE 1,995,940

CRATE CONSTRUCTION

John H. Petermann, Sr., Carroll Schwartz, and Alban Atkinson, New Orleans, La.

Application October 10, 1933, Serial No. 693,010

2 Claims. (Cl. 217—48)

The invention relates to a crate construction and more especially to knockdown fruit or vegetable shipping crates.

One of numerous objects of the invention is the provision of a crate construction of this character wherein fruits or vegetables contained within boxes can be conveniently placed therein for safe shipment and such fruits or vegetables may be conveniently inspected for determining their condition while crated, the crate being of novel construction to assure thorough ventilation and without liability of loss of the fruits or vegetables during shipment.

Another object of the invention is the provision of a crate of this character wherein the boxed fruits or vegetables are supported upon dividers or trays, these being removably arranged within the crate construction and such latter being assembled without the use of nails, while the dividers or trays are conveniently held in place when within the crate construction to avoid any displacement thereof, the containers for the fruits or vegetables being confined in rigid position without liability of crushing or damaging their contents, the crate being readily accessible in a novel manner and susceptible of being knocked down when not in use and set up with dispatch for use.

A further object of the invention is the provision of a crate construction of this character which is simple in its make-up, thoroughly reliable and efficient in its purposes, strong, durable, novel in its assembly, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a perspective view of a crate construction in accordance with the invention and set up for service.

Figure 2 is a vertical longitudinal sectional view therethrough.

Figure 3 is a sectional view on the line 3—3 of Figure 2 looking in the direction of the arrows and showing by dotted lines one of the side slats or pieces open for access to the crate.

Figure 4 is a vertical transverse sectional view showing by dotted lines the top partially removed and by full lines a tray or divider drawn out of the crate proper.

Figure 5 is a fragmentary plan view partly in section showing the manner of securing one of the side slats or pieces closed.

Figure 6 is a view similar to Figure 5 showing the side slat or piece released and partly open.

Figure 7 is a fragmentary perspective view on an enlarged scale of the manner of fastening the side slat or piece.

Similar reference characters indicate corresponding parts throughout the several views in the drawings.

Referring to the drawings in detail, the crate construction embodies a crate body A, this including spaced side and end slats or pieces 10 and 11, respectively, the side slats or pieces being supplemented by bottom rails 12, while the end slats or pieces 11 are supplemented by top guide cleats 13, all being pivotally connected through the medium of vertical pivot bolts or rods 14, the same being made fast in place in any suitable manner. The slats 10 and 11, rails 12 and cleats 13 at their ends being alternately in overlapped relation it will be seen that the body A can be readily collapsed or knocked down for convenience in storage or shipment when not in service in crating fruits or vegetables.

One of the slats 10 at each side of the body A is provided in the inner face thereof, at one end, with a groove or channel 15 which opens through the inner face to receive the bolt or rod 14 so that this particular slat or piece can be detached for hinge movement to open position so that access may be had to the interior of the body A of the crate from either side thereof. The grooved or channeled end of the slat or piece 10 has slidably fitted thereto a latch in the form of a split band 16 partially embracing said slat or piece for sliding movement. This band 16 carries a bendable tongue 17 which is adapted to bridge the groove or channel 15 to retain the rod or bolt 14 when seated therein and such tongue 17 is folded over and about the free end of the slat or piece 10 to hold the band 16 against sliding movement, the tongue being readily bendable for the releasing or fastening of the latch, as should be obvious in Figures 5, 6 and 7 of the drawings.

Removably fitted within the body A are dividers or trays 18, each at their under faces carrying intermediate and outer cleats or substantially V-shaped strips 19, the outer cleats or strips 19 being inset a distance from the side edges of the trays or dividers so that the latter may be positioned for rest upon the side slats or pieces 10 to be superposed when placed within the body A of the crate. These outer cleats or strips 19 contact with the slats or pieces 10 upon which the trays 18 rest, to avoid any liability of the dropping of such trays or dividers or displacement thereof when within the crate body.

It should be apparent that when unlatching a side slat or piece 10 and swinging the same to open position, these trays 18 are susceptible of removal, or fruits or vegetables as contained within baskets or boxes 20 can be readily inspected for determining the condition thereof. These baskets or boxes 20 are superimposed upon the dividers or trays 18, as shown by dotted lines in Figure 4 of the drawings. The baskets or boxes 20 when upon the dividers or trays 18 are fixedly held without any liability of the crushing or damaging of their contents. The crate body A of the open slat construction allows free ventilation to its contents. The trays or dividers 18 have the floor sections 21.

Slidably fitted in the cleats 13 is a solid top section 22 constituting a closure cover for the top of the crate body A, as will be apparent.

It should be obvious that the crate body A in its assembly is devoid of nails or other like fasteners, the bolts or rods 14 connecting the slats both at the sides and ends of the body and constituting pivots therefor to permit the collapsing of such body when vacant of fruit or vegetable contents, it being understood, of course, that the trays or dividers 18 are removed, as well as the top 22, when such body A is to be collapsed.

What is claimed is:

1. A crate of the character described comprising a body having shiplapped side and end slats, pivots connecting the side and end slats together, one slat in each side having at its inner face and at one end a groove opening through said face to receive the pivot to release the latter of pivotal connection therewith, a slide carried by each grooved slat and having a bendable tongue for bridging the groove to retain the pivot therein and foldable over the end adjacent thereto for the fixing of the slide, and top and bottom sections for the slatted body.

2. A crate of the character described comprising a body having shiplapped side and end slats, pivots connecting the side and end slats together, one slat in each side having at its inner face and at one end a groove opening through said face to receive the pivot to release the latter of pivotal connection therewith, a slide carried by each grooved slat and having a bendable tongue for bridging the groove to retain the pivot therein and foldable over the end adjacent thereto for the fixing of the slide, and top and bottom sections for the slatted body and fixedly connected with the pivots.

JOHN H. PETERMANN, Sr.
CARROLL SCHWARTZ.
ALBAN ATKINSON.